United States Patent
Ko et al.

(10) Patent No.: US 11,601,205 B2
(45) Date of Patent: Mar. 7, 2023

(54) UNDERWATER COMMUNICATION METHOD

(71) Applicant: Hoseo University Academic Cooperation Foundation, Chungcheongnam-do (KR)

(72) Inventors: Hak-Lim Ko, Chungcheongnam-do (KR); Yong-Kap Cho, Gyeonggi-do (KR); Tae-Ho Im, Chungcheongnam-do (KR)

(73) Assignee: Hoseo University Academic Cooperation Foundation, Chungcheongnam-do (KR)

( * ) Notice: Subject to any disclaimer, the term of this patent is extended or adjusted under 35 U.S.C. 154(b) by 699 days.

(21) Appl. No.: 16/064,750

(22) PCT Filed: Nov. 8, 2016

(86) PCT No.: PCT/KR2016/012764
§ 371 (c)(1),
(2) Date: Jun. 21, 2018

(87) PCT Pub. No.: WO2017/111298
PCT Pub. Date: Jun. 29, 2017

(65) Prior Publication Data
US 2018/0375592 A1    Dec. 27, 2018

(30) Foreign Application Priority Data
Dec. 21, 2015  (KR) .......................... 10-2015-0182910

(51) Int. Cl.
*H04B 11/00*    (2006.01)
*H04B 13/02*    (2006.01)
(Continued)

(52) U.S. Cl.
CPC .............. *H04B 11/00* (2013.01); *G01S 11/14* (2013.01); *H04B 13/02* (2013.01); *H04B 17/27* (2015.01);
(Continued)

(58) Field of Classification Search
None
See application file for complete search history.

(56) References Cited

U.S. PATENT DOCUMENTS 5,121,366 A * 6/1992 Wayner .................. H04B 11/00
367/134
5,303,207 A * 4/1994 Brady .................... H04B 11/00
367/134

(Continued)

FOREIGN PATENT DOCUMENTS

CN    102122993 A  *  7/2011
CN    104796959 A  *  7/2015
(Continued)

OTHER PUBLICATIONS

Stojanovic, Milica. "On the relationship between capacity and distance in an underwater acoustic communication channel." ACM SIGMOBILE Mobile Computing and Communications Review 11.4 (2007): 34-43. (Year: 2007).*
(Continued)

*Primary Examiner* — Isam A Alsomiri
*Assistant Examiner* — Jonathan D Armstrong
(74) *Attorney, Agent, or Firm* — Baker Donelson

(57) ABSTRACT

The present invention relates to an underwater communication method capable of communicating with a plurality of sensor nodes within a limited frequency band. Underwater information communication of the present invention allocates an appropriate frequency to each sensor node according to the distance between a central node and the plurality
(Continued)

of sensor nodes, and then, controls underwater communication between the central node and the plurality of sensor nodes using the allocated frequency. By virtue of such control, the present invention prevents the occurrence of an unusable sensor node which cannot smoothly perform underwater communication when the allocated frequency is unreasonable. Therefore, the present invention has the effect of enabling efficient underwater communication between a plurality of sensor nodes and a central node.

15 Claims, 10 Drawing Sheets

(51) Int. Cl.
| | | |
|---|---|---|
| H04B 17/318 | (2015.01) | |
| H04B 17/27 | (2015.01) | |
| H04W 4/02 | (2018.01) | |
| H04L 67/12 | (2022.01) | |
| H04B 17/327 | (2015.01) | |
| H04W 4/38 | (2018.01) | |
| G01S 11/14 | (2006.01) | |
| H04W 72/0453 | (2023.01) | |

(52) U.S. Cl.
CPC ......... *H04B 17/318* (2015.01); *H04B 17/327* (2015.01); *H04L 67/12* (2013.01); *H04W 4/023* (2013.01); *H04W 4/38* (2018.02); *H04W 72/0453* (2013.01)

(56) References Cited

U.S. PATENT DOCUMENTS

| | | | | |
|---|---|---|---|---|
| 6,272,072 | B1* | 8/2001 | Wulich | G01S 3/8022 |
| | | | | 367/118 |
| 6,625,083 | B2* | 9/2003 | Vandenbroucke | G01V 1/16 |
| | | | | 367/15 |
| 6,850,173 | B1* | 2/2005 | Steinbrecher | G01S 7/52001 |
| | | | | 340/984 |
| 9,668,274 | B1* | 5/2017 | Bartlett | H04W 72/1231 |
| 9,853,742 | B1* | 12/2017 | Radosevic | H04B 11/00 |
| 9,992,038 | B2* | 6/2018 | Youngbull | H04L 45/16 |
| 10,476,605 | B2* | 11/2019 | Ko | H04B 13/02 |
| 10,491,309 | B1* | 11/2019 | Rao | H04B 10/80 |
| 10,749,611 | B2* | 8/2020 | Yoshida | G01S 11/02 |
| 10,784,970 | B2* | 9/2020 | Melodia | H04B 11/00 |
| 2003/0027577 | A1* | 2/2003 | Brown | H04W 72/00 |
| | | | | 455/445 |
| 2004/0155815 | A1* | 8/2004 | Muncaster | G01C 21/26 |
| | | | | 342/357.75 |
| 2008/0095107 | A1* | 4/2008 | Tillotson | H04W 72/10 |
| | | | | 370/329 |
| 2011/0064151 | A1* | 3/2011 | Rhodes | H04B 13/02 |
| | | | | 375/260 |
| 2014/0044154 | A1* | 2/2014 | Wolfe | H04B 13/02 |
| | | | | 375/218 |
| 2015/0071039 | A1* | 3/2015 | Rahkonen | H04B 11/00 |
| | | | | 367/134 |
| 2015/0288459 | A1* | 10/2015 | Crowell | H04B 11/00 |
| | | | | 367/131 |
| 2016/0050030 | A1* | 2/2016 | Riedl | G08C 23/02 |
| | | | | 367/133 |
| 2016/0124105 | A1* | 5/2016 | Valsvik | B63G 8/001 |
| | | | | 367/15 |
| 2018/0145771 | A1* | 5/2018 | Melodia | H04B 13/02 |
| 2019/0007146 | A1* | 1/2019 | Ko | H04W 72/048 |
| 2019/0199450 | A1* | 6/2019 | Yoshida | H04B 1/0475 |
| 2019/0319705 | A1* | 10/2019 | Harris | H04W 40/30 |
| 2019/0387509 | A1* | 12/2019 | Ko | H04W 72/0453 |
| 2020/0180740 | A1* | 6/2020 | Christ | G05D 1/0027 |
| 2020/0396010 | A1* | 12/2020 | Melodia | H04B 11/00 |

FOREIGN PATENT DOCUMENTS

| | | | | |
|---|---|---|---|---|
| WO | WO-9410629 A1 * | 5/1994 | | H04B 11/00 |
| WO | WO-2006025798 A1 * | 3/2006 | | G01H 3/08 |

OTHER PUBLICATIONS

Peleato, Borja, and Milica Stojanovic. "Distance aware collision avoidance protocol for ad-hoc underwater acoustic sensor networks." IEEE Communications letters 11.12 (2007): 1025-1027. (Year: 2007).*
Baldo, Nicola, Paolo Casari, and Michele Zorzi. "Cognitive spectrum access for underwater acoustic communications." ICC Workshops—2008 IEEE International Conference on Communications Workshops. IEEE, 2008. (Year: 2008).*
Baldo, Nicola, et al. "Effective heuristics for flexible spectrum access in underwater acoustic networks." Oceans 2008. IEEE, 2008. (Year: 2008).*
Stojanovic, Milica. "Design and capacity analysis of cellular-type underwater acoustic networks." IEEE journal of oceanic engineering 33.2 (2008): 171-181. (Year: 2008).*
Noh, Youngtae, et al. "DOTS: A propagation delay-aware opportunistic MAC protocol for underwater sensor networks." The 18th IEEE International Conference on Network Protocols. IEEE, 2010. (Year: 2010).*
Ali, Tariq, Low Tang Jung, and Ibrahima Faye. "Diagonal and vertical routing protocol for underwater wireless sensor network." Procedia—Social and Behavioral Sciences 129 (2014): 372-379. (Year: 2014).*
Casari, Paolo, and Michele Zorzi. "Protocol design issues in underwater acoustic networks." Computer Communications 34.17 (2011): 2013-2025. (Year: 2011).*
Luo, Yu, et al. "Challenges and opportunities of underwater cognitive acoustic networks." IEEE Transactions on Emerging Topics in Computing 2.2 (2014): 198-211. (Year: 2014).*
Noh, Youngtae, et al. "DOTS: A propagation delay-aware opportunistic MAC protocol for mobile underwater networks." IEEE Transactions on Mobile Computing 13.4 (2014): 766-782. (Year: 2014).*
Ghannadrezaii, Hossein, and Jean-François Bousquet. "Maximizing network coverage in a multichannel short-range underwater acoustic sensor network." Computer Networks 160 (2019): 1-10. (Year: 2019).*

* cited by examiner

UNDERWATER COMMUNICATION METHOD

CROSS-REFERENCE TO RELATED APPLICATION(S)

The present application is a national entry of PCT KR2016/012764 filed Nov. 8, 2016, which derives priority from Korea Application Serial No. 10-2015-0182910 filed Dec. 21, 2015.

FIELD OF THE INVENTION

The teachings in accordance with exemplary and non-limiting embodiments of this invention relate generally to an underwater communication method, and more particularly to an underwater communication method configured to communicate with a plurality of sensor nodes within a limited frequency band.

DESCRIPTION OF THE BACKGROUND

Concomitant with increased interest and importance in marine resources exploration, marine environmental surveillance and underwater military defenses, demand on underwater communication capable of collecting multifarious underwater information from oceans has recently increased. The underwater communication is performed using ultrasonic waves because of physical properties of media. A communication network for underwater information transmission may be implemented by installing a sensor node capable of performing transmission/reception of underwater information under underwater environments, and by obtaining and controlling underwater information from the sensor node.

Because of underwater communication environments using ultrasonic waves, the underwater communication network is relatively smaller in bandwidth of signal that is transmitted than the land communication, and signal attenuation relative to distance is also very large. That is, frequencies used in underwater communication network have to be very limited in order to perform a reliable communication at a distance of several kilo meters to several scores of kilo meters.

Moreover, when the demand on underwater information obtainment using underwater communication network increases, the number of sensor nodes performing communication in the underwater also increases. However, the conventional underwater communication network failed to efficiently control the sensor nodes due to limitation of frequencies useable at the underwater channel environments. That is, when only one frequency is used to perform the communication in the conventional underwater communication network, and when a relevant frequency is allocated to one sensor node, all other sensor nodes cannot transmit or receive a signal.

Furthermore, when communication is performed using a plurality of frequencies in the conventional underwater communication network, and when the number of sensor nodes wanting to perform a communication in the water is greater than the allocated frequency, the underwater sensor nodes as many as the number exceeding the allocated frequency cannot transmit or receive a signal. In addition, in this case, all sensor nodes must continuously inspect what frequency an ambient sensor node uses by being allocated, such that battery consumption greatly increases in the water to greatly decrease an operation period of underwater sensor node.

Thus, the conventional underwater communication network has limited the number of communicable sensor nodes because a plurality of sensor nodes cannot be efficiently managed. On top of that, it has become inevitable to increase the number of sensor nodes due to increases in various demands on marine information, and therefore, the trend is that an efficient control of underwater communication network in various areas is greatly required.

SUMMARY OF THE INVENTION

It is an object of an exemplary embodiment of the present invention to provide an underwater communication method configured to efficiently communicate with a multifarious number of sensor nodes in a underwater communication network using a limited frequency band.

Another object of the present invention is to provide a underwater communication method configured to control an efficient underwater communication using a multifarious number of sensor nodes by allocating a same frequency to a plurality of sensor nodes disposed at a similar communication distance by dividing a limited frequency bandwidth of underwater communication network by a plurality of smaller frequency bandwidth.

In one general aspect of the present invention, there is provided an underwater communication method in an underwater communication using a central node transmitting to a terrestrial network by aggregating detection information from a plurality of central node detecting the underwater information, the method comprising:

recognizing, by the central node, an entire useable frequency band, setting a frequency band included with a lowest frequency as a forward direction frequency band, and setting a remaining frequency band as a backward direction frequency band;

dividing the backward direction frequency band to a plurality of small frequency bands as many as an arbitrary number of areas;

estimating a distance between the central node and the plurality of sensor nodes; and allocating a small frequency band adequate to each sensor node in response to the estimated distance.

Preferably, but not necessarily, the method may include using the forward direction frequency band when transmitting a signal from the central node to the plurality of sensor nodes.

Preferably, but not necessarily, the distance estimating Step may include: transmitting the forward direction frequency band including a reference signal from the central node to the plurality of sensor nodes;

receiving a transmission signal from the sensor node and detecting a power size of a reception signal; and recognizing a distance value corresponding to the detected power size.

Preferably, but not necessarily, the distance estimating Step may include: transmitting the forward direction frequency band including a reference signal from the central node to the plurality of sensor nodes;

detecting a delayed time consumed from transmission of the reference signal to arrival of the reference signal at the sensor node; and recognizing a distance value corresponding to be detected delayed time.

Preferably, but not necessarily, the distance estimating Step may be performed by the central node or the sensor node.

Preferably, but not necessarily, the frequency allocating Step may include requesting a frequency band adequate to the estimated distance.

Preferably, but not necessarily, the small frequency band allocated to the plurality of sensor nodes may include using at the time of signal transmission from the sensor node to the central node.

Preferably, but not necessarily, the signal transmission from the central node to the sensor node prior to allocation of the small frequency band to the sensor node may be realized by the forward direction frequency band, and the signal transmission from the sensor node to the central node may be realized by the lowest frequency band in the divided backward direction frequency band.

Preferably, but not necessarily, the arbitrary number of areas at the Step of dividing the backward direction frequency band to a plurality of small frequency band as many as the arbitrary number of area may be a value corresponding to the number of distances by dividing the entire frequency band to a receivable/transmissible distance using a particular frequency.

Preferably, but not necessarily, the plurality of sensors having the same frequency band may be controlled in the underwater communication by multiple connection method by allocating the same frequency band to the plurality of sensors disposed at the divided distance.

The underwater communication method according to the present invention is such that an underwater information communication is performed by allowing a frequency band adequate to distance information between a central node (20) and a plurality of sensor nodes (10). Thus, the present invention is free from un-useable sensor node where underwater communication is not smoothly realized due to an allocated frequency being absurd. That is, the underwater communication method according to the present invention has an advantageous effect of efficiently realizing an underwater communication between the plurality of sensor nodes (10) and the central node (20).

In addition, the underwater communication method according to the present invention is such that the underwater communication is performed by efficiently controlling a plurality of sensor nodes in response to control of multiple connection method of central node (20) by allocating the same frequency band to a plurality of sensor nodes (10) within a limited frequency band.

DETAILED DESCRIPTION OF THE PREFERRED EMBODIMENTS

Figure 1:
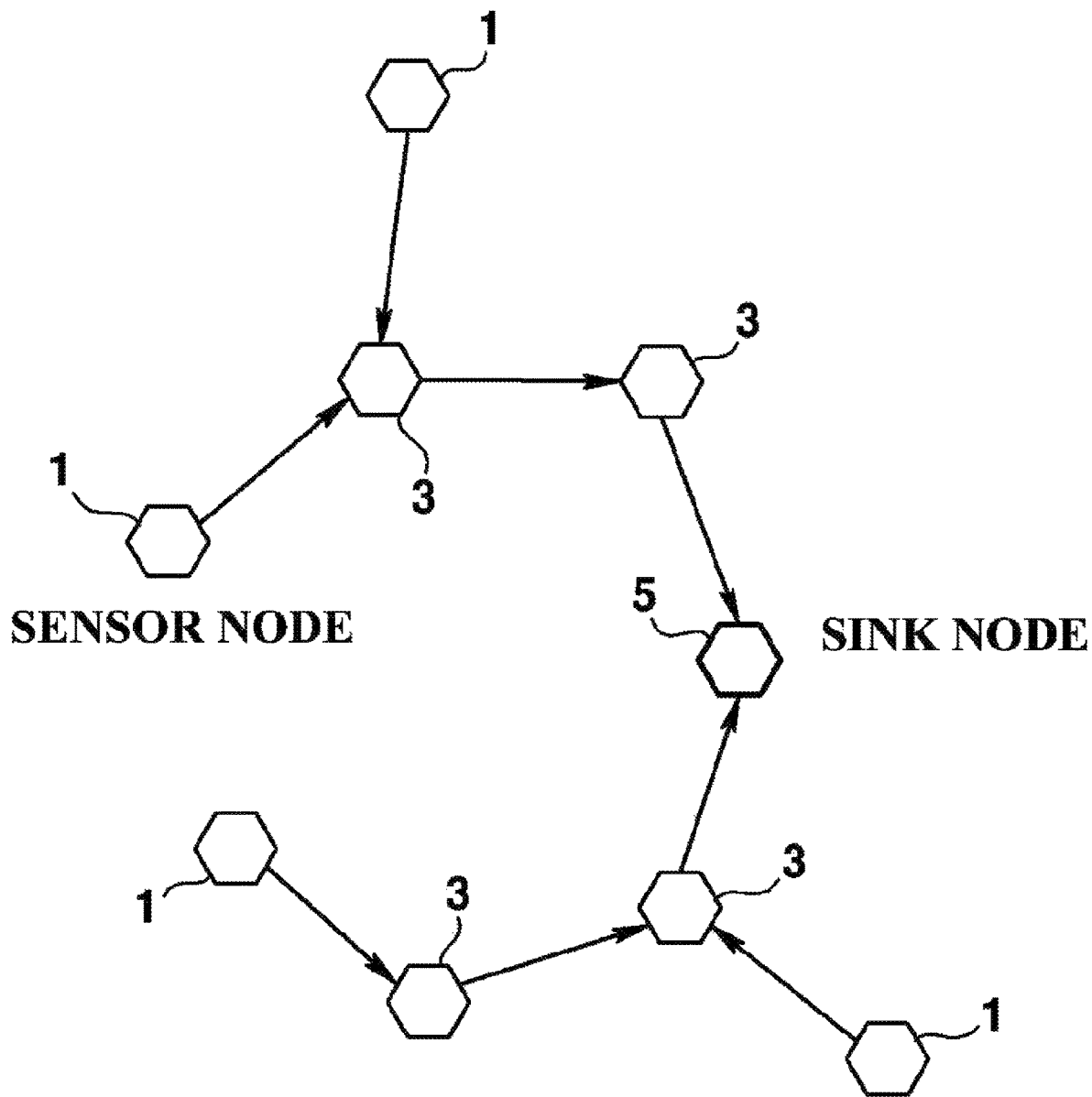
FIG. 1 is a schematic view illustrating a conventional underwater communication network used to an underwater communication that is illustrated in order to help understand the present invention.

Some of the exemplary embodiments of the present invention will be described in detail with the accompanying drawings, where throughout the descriptions, the same reference numerals will be assigned to the same elements in the explanations of the figures, and overlapping explanation thereto will be omitted.

The suffixes 'unit', 'part' and 'node' may be used for elements in order to facilitate the easy writing of specification. Significant meanings or roles may not be given to the suffixes themselves and it is understood that the 'unit', 'part' and 'note' may be used together or interchangeably.

In describing the present invention, detailed descriptions of well-known art in the art may be omitted to avoid obscuring appreciation of the invention by a person of ordinary skill in the art with unnecessary details. Furthermore, the accompany drawings are merely provided to facilitate easy understanding of exemplary embodiments disclosed in the present specification, and technical ideas disclosed in the specification are not limited by the accompany drawings, and it will be appreciated that the described aspect is intended to embrace all such alterations, modifications, and variations that fall within the scope and novel idea of the present disclosure.

It will be understood that, although the terms first, second, etc. may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

As used herein, the singular forms "a," "an" and the are intended to include the plural forms as well, unless the context clearly indicates otherwise. It will be further understood that the terms "comprises" "includes" and/or "comprising," "including" when used in this specification, specify the presence of stated features, integers, Steps, operations, elements, and/or components, but do not preclude the presence or addition of one or more other features, integers, Steps, operations, elements, components, and/or groups thereof.

Hereinafter, exemplary embodiments of the present invention will be described in detail with reference to the accompanying drawings. It will be appreciated to the skilled in the art that the present invention will be embodied in other particular forms unless deviated from the spirit and essential features of the present invention.

FIG. 1 is a schematic view illustrating a conventional underwater communication network used to an underwater communication that is illustrated in order to help understand the present invention.

The underwater communication network illustrated is FIG. 1 may be formed by including a plurality of sensor nodes (1), a sink node (5), an intermediate note (3) performing an information transfer role between the sensor nodes (1) and the sink node (5).

The transmission of underwater information in the underwater communication network thus configured may be realized in the following manner. The underwater information detected from the plurality of sensor nodes (1) is transmitted to the sink node (5) through the intermediate node (3) formed by the sensor nodes (1) with several Steps. However, the underwater communication network thus configured must go through several Steps of intermediate node (3) in transmitting the underwater information detected from the sensor node (1) to the sink node (5). Thus, routing algorithm for transmitting the detected underwater information in the underwater communication network connected from the sensor node (1), the intermediate node (3) of several Steps and sink node is realized in a complex manner.

Furthermore, when an error is generated in the process of transmitting the underwater information from the sensor node (1) to the sink node (5) in the underwater communication network, a process of re-transmitting the detected underwater information can be cumbersome. In addition, because the underwater communication network must pass through several Steps of intermediate node (3), and therefore, when there is generated a problem in the intermediate node that transmits the underwater information, a sensor node related to the intermediate node that is generated with the problem cannot be used.

Hence, because of these and other problems, the conventional underwater communication network illustrated in FIG. 1 has to suffer from disadvantages of decreased efficiency in usage including data transmission efficiency in the processes of obtaining and transmitting various types of underwater information.

Hereinafter, as used in the explanation of the present invention, the "frequency band" and the "frequency" may be interchangeably used. The "frequency" may be called a frequency included in the "frequency band", where, because frequencies in a predetermined scope thereof are carried with an almost same signal, the two terms of "frequency band" and "frequency" may be expressed with a same meaning.

Figure 2:
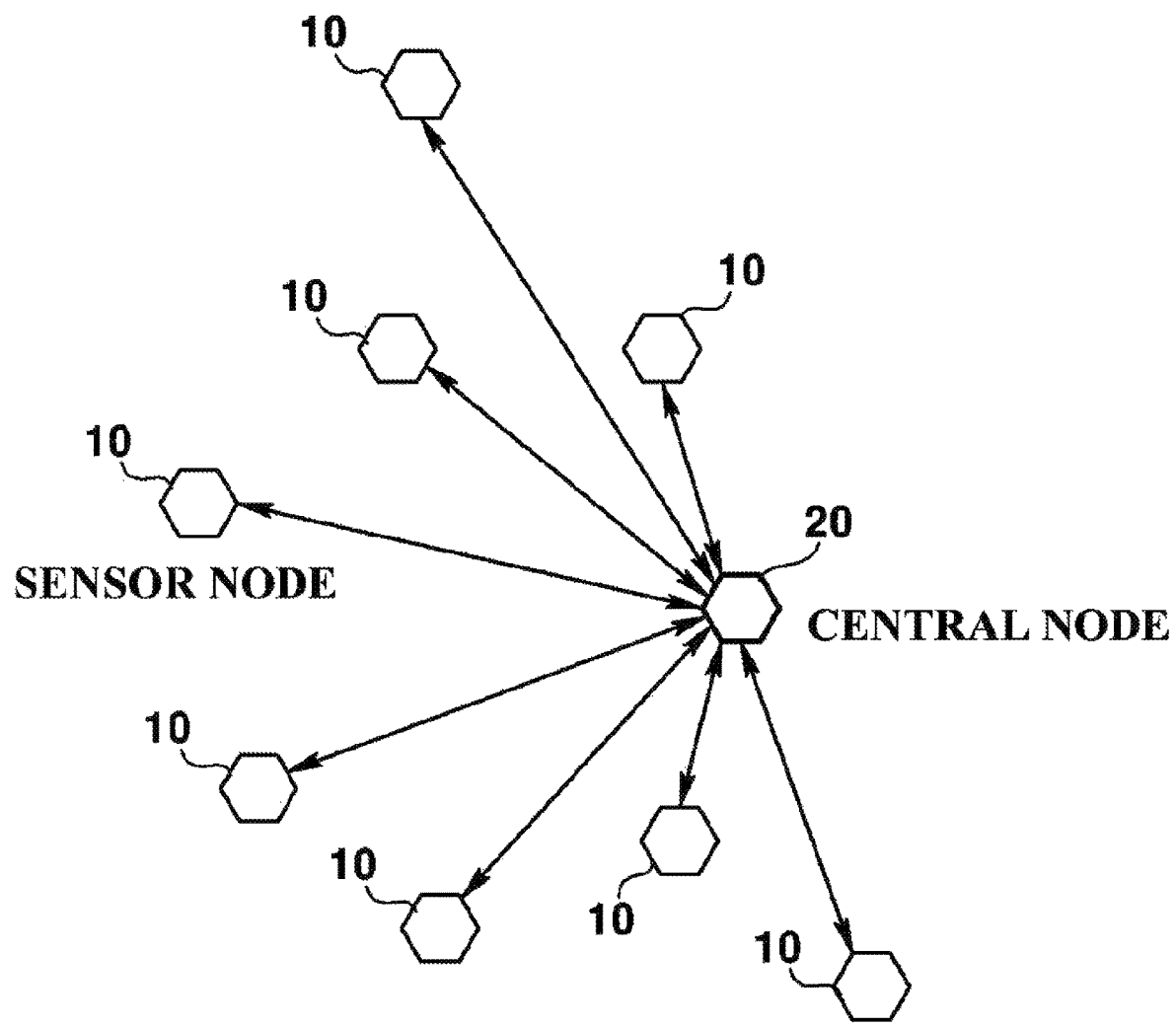
FIG. 2 is a conceptual view illustrating a centrally controlled underwater communication network realized to explain an underwater communication method according to an exemplary embodiment of the present invention.

FIG. 2 is a conceptual view illustrating a centrally controlled underwater communication network realized to explain an underwater communication method according to an exemplary embodiment of the present invention.

The centrally controlled underwater communication network according to an exemplary embodiment of the present invention may be realized by connecting the sensor nodes from an underwater environment to a centralized manner. The centralized control type underwater communication network may include more than one sensor node (10). The sensor node (10) may be fixedly or movably installed in an underwater environment. The sensor node (10) may be installed in as many numbers as possible in order to obtain a large quantity of underwater information. The centralized control type underwater communication network may include a central node (20) that performs to transmit to a terrestrial network the underwater information collected from the plurality of sensor nodes (10). The centralized control type underwater communication network thus configured may be controlled in the following overall way.

Figure 3:
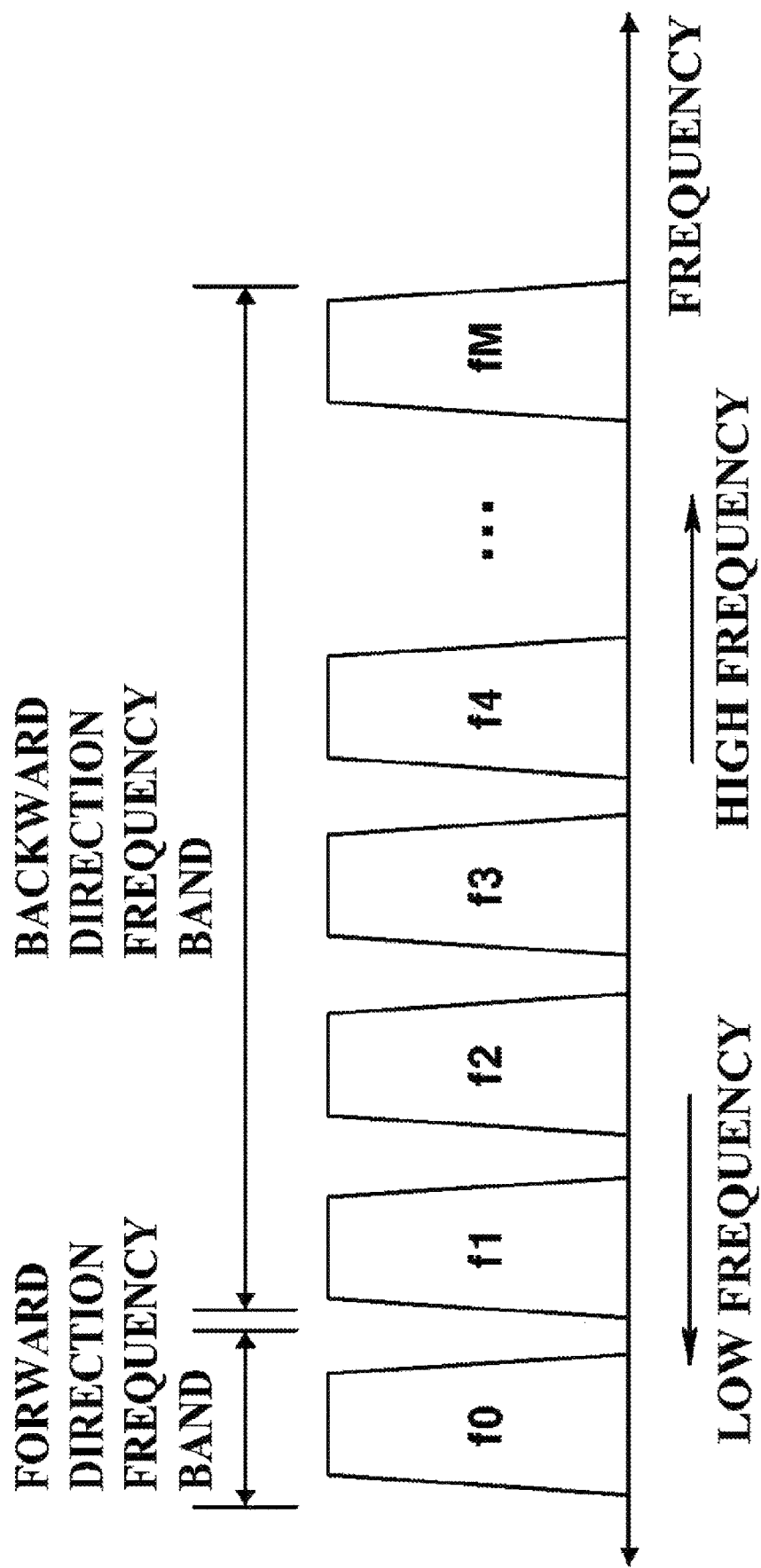
FIG. 3 is a schematic view illustrating a process of dividing a frequency band for underwater communication within a limited frequency band according to an exemplary embodiment of the present invention.

FIG. 3 is a schematic view illustrating a process of dividing a frequency band into a predetermined number of small frequency bands for controlling the underwater communication within a limited frequency band according to an exemplary embodiment of the present invention.

Referring to FIG. 3, the underwater communication performed between the central node (20) and a plurality of sensor nodes (10) is basically implemented using an ultrasonic waves. Furthermore, an entire frequency band useable in the central node (20) may be divided to a forward (direction) frequency band and a backward (reverse) (direction) frequency band. Here, the entire frequency band useable by the central node (20) means a frequency band included for underwater communicationable area between the central node (20) and sensor nodes (10), each installed at a different distance. That is, the entire frequency band useable by the central node (20) means a frequency band that is useable where a signal transmission is enabled from the central node (20) to a sensor node (10) installed at an arbitrary position, and a signal transmitted from the sensor node (10) can be received by the central node (20).

The forward (direction) frequency band may be used when a signal is transmitted from the central node (20) to the plurality of sensor nodes (10). The frequency band that is used at this time may be set at a lowest frequency band (f0) in the useable frequency band. In general, a communication scope increases when transmitted/received frequencies are low in the underwater communication environment. Hence, when a signal is transmitted from the central node (20) to the sensor node (10), signal reception is possible in all sensor nodes regardless of distance. Therefore, a frequency band (f0) having the lowest frequency is determined as a forward direction frequency band to be used for signal transmission from the central node (20) to the plurality of sensor nodes (10).

Furthermore, the backward (reverse) direction frequency band may be used when a signal transmission is performed from each sensor node (10) to the central node (20). Here, an entire remaining frequency band except for the forward direction frequency band in the useable entire frequency band may be included in the backward direction frequency band. Moreover, the backward direction frequency band may be in turn divided into a plurality of small frequency bands.

At this time, the small frequency band division may be realized based on a distance from the central node (20) to the sensor node (10). That is, a same frequency band may be used in the central node, and the sensor nodes existing at a transmissible/receivable distance may be set at the same area. Thus, the number (M number of areas, described later) of small frequency bands may be generated as many as the number of divided areas. In addition, the respectively-divided small frequency bands may be allocated to be used for signal transmission of the sensor nodes (10), each installed at a mutually different position. For example, a frequency band (f1) may be allocated to a sensor node (10) disposed at a longest distance from the central node (20). Then, a frequency band (Fm) may be allocated to a sensor node (10) disposed at a closest distance from the central node (20).

In this case, based on the central node (20), the sensor node (10) disposed at a longest distance may be allocated with a lowest frequency band in the frequency band included in the forward direction frequency band. Conversely, based on the central node (20), the sensor node (10) disposed at a closest distance may be allocated with a highest frequency band in the frequency band included in the backward direction frequency band. This is, because, as explained briefly before, a communication scope increases when the transmissible/receivable frequencies are low in an underwater communication environment, a frequency (f1) of low frequency band is allocated as a longest communication frequency. Moreover, a frequency of the highest frequency band is allocated as the shortest communication frequency.

Through these processes, a frequency band for underwater communication is allocated for each sensor node (10), and thereafter, the underwater communication is implemented where transmission of underwater information to the central node (20) is realized by using the frequency band allocated with the underwater information detected from the sensor node (10).

Figure 4:
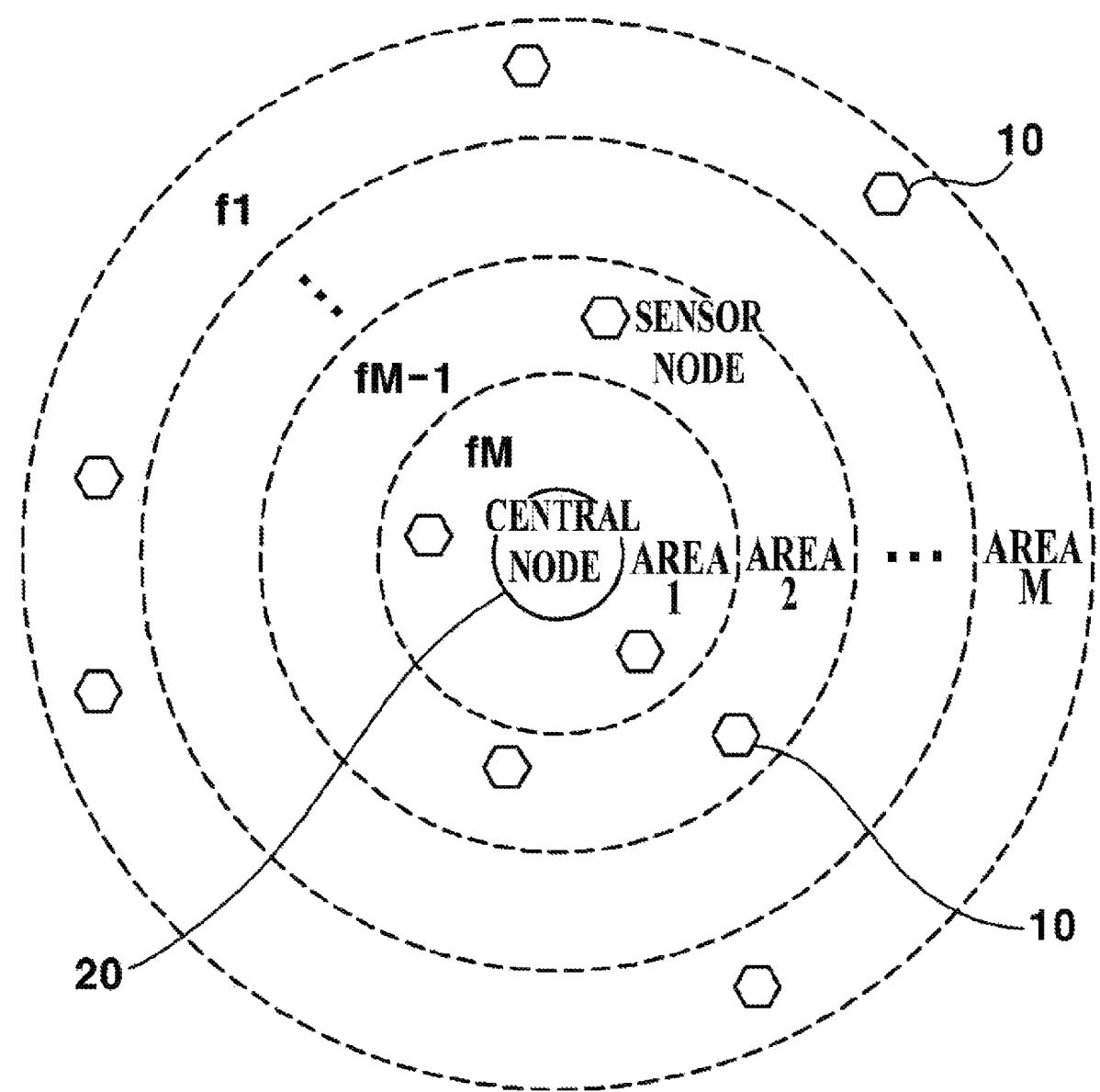
FIG. 4 is a schematic view illustrating a process of allocating a same frequency band to a plurality of sensor nodes in response to a communication distance within limited frequency band according to an exemplary embodiment of the present invention.

Next, FIG. 4 is a schematic view illustrating a process of allocating a same frequency band to a plurality of sensor nodes in response to a communication distance within a limited frequency band according to an exemplary embodiment of the present invention.

The underwater communication is more affected by environmental factors than the terrestrial communication. Therefore, a situation of the sensor node (10) being lost by environmental influences is inevitably generated in the process of detecting underwater information using the underwater sensor within the sensor node (10). Furthermore, even if an arbitrary sensor node (10) has normally detected the underwater information, the data transmission success rate cannot be always 100% satisfied in the course of the detected underwater information being transmitted to the central node (20). Thus, as long as circumstances of underwater communication network are permitted, installation of as many number of sensor nodes (10) as possible may allow variable and accurate obtainment of underwater information.

Meantime, as illustrated in FIG. 4, a signal-transmissible area to a same frequency band is existent between the central node (20) and the sensor node (10). That is, based on the central node (20), the sensor nodes existent in an area 1 included in the closest distance may be equally allocated with the divided frequency band (fM). Furthermore, based on the central node (20), the sensor nodes existent at an area (M) included in the longest distance may be equally allocated with the divided frequency band (f1).

The area division to the same area or different area between the central node (20) and the sensor node (10) may be divisible within the signal-transmissible receivable scope between the central node (20) and the sensor node (10). That is, sensor nodes underwater communicationable in the same frequency band (fM) may be included in area 1. Furthermore, sensor nodes underwater communicationable in the same frequency band (f1) may be included in area M.

The reason of allocating same frequency band to several sensor nodes is because there is a limit in frequency band useable in the central node (20). For example, there is no way but to increase the number of sensor nodes in order to obtain the underwater information mot accurately and variably.

In this case, cases may be generated where the number of sensor nodes (10) installed within the entire frequency band useable in the central node (20) exceeds the number of divided backward direction frequency bands. At this time, as illustrated in FIG. 4, the sensor nodes existent in the same area are allocated with same frequency bands to control the underwater communication.

Meantime, when several sensor nodes are allocated with same frequency band, a plurality of sensor nodes (10) existent in the same area that have received same frequency band can implement communication with the central nodes (20) using various multiple access methods (frequency-division multiple access method, time division multiple access method, code division multi-connection method, carrier sensing multiple connection method, etc.) in response to the control by the central nodes (20). The well-known multiple access methods are omitted of further elaborations.

Next, in order to enable an adaptive communication in response to distance between the central node and the sensor node in the underwater communication network according to an exemplary embodiment of the present invention, a process of detecting distance information from a central node to a sensor node. Prior to explanation thereto, a schematic configuration for transmission/reception of underwater information between a central node and a sensor node according to the present invention will be described.

Figure 5:
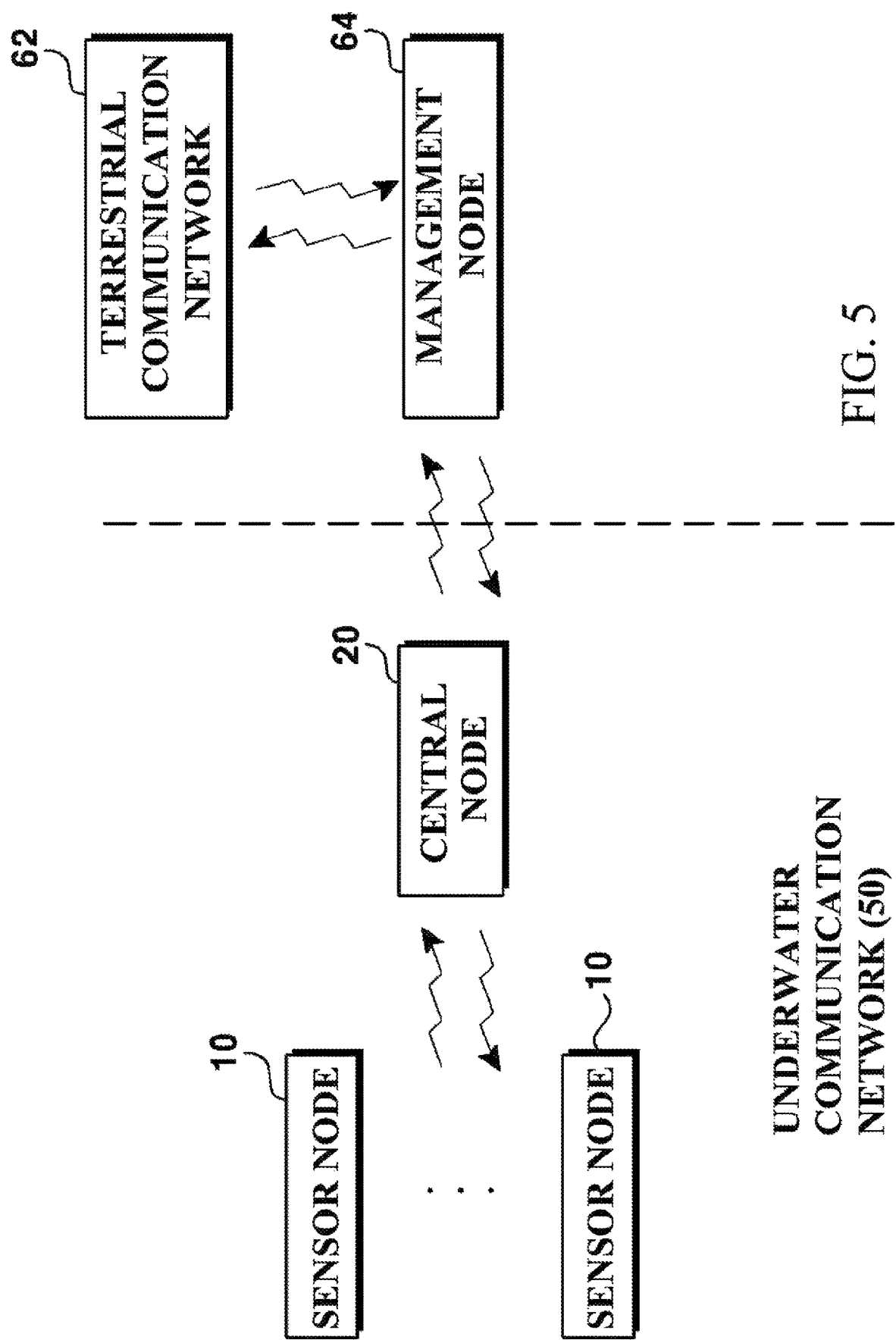
FIG. 5 is a schematic diagram illustrating an underwater communication method on the whole according to an exemplary embodiment of the present invention.
Figure 6:
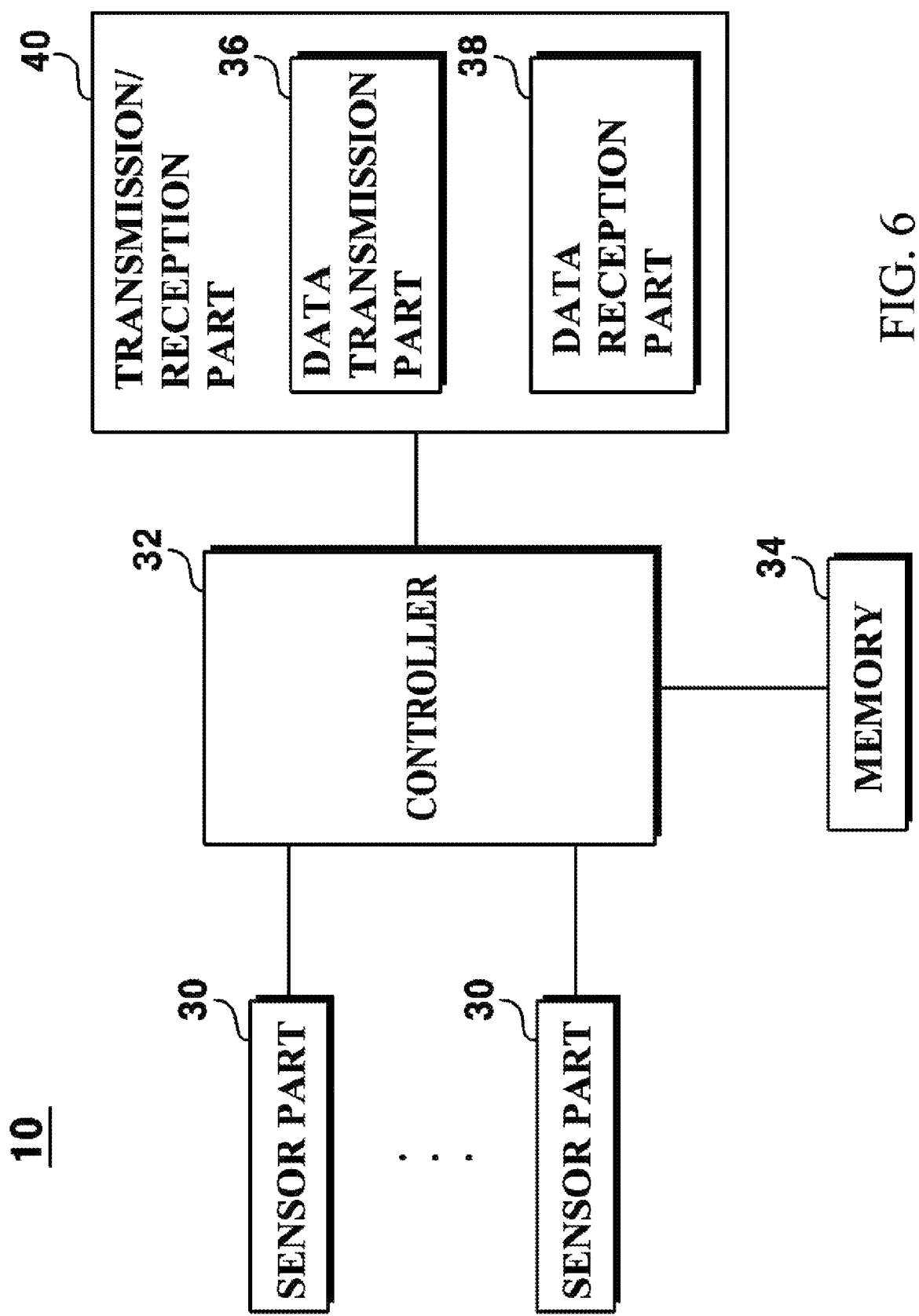
FIG. 6 is a schematic diagram illustrating a sensor node for explaining an underwater communication method according to an exemplary embodiment of the present invention.

FIG. 5 is a schematic diagram illustrating an underwater communication method on the whole according to an exemplary embodiment of the present invention. FIG. 6 is a schematic diagram illustrating a sensor node for explaining an underwater communication method according to an exemplary embodiment of the present invention.

Figure 7:
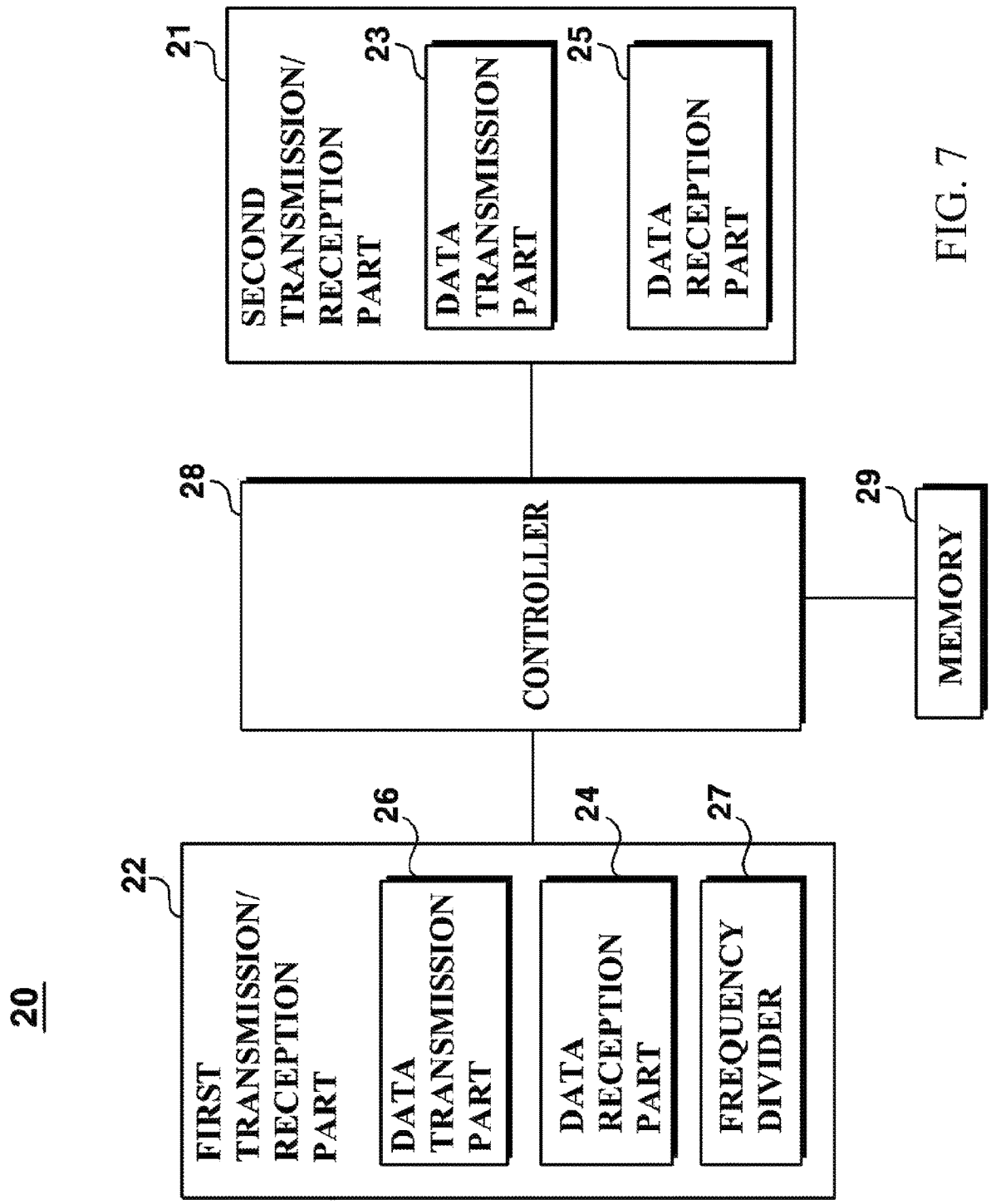
FIG. 7 is a schematic diagram illustrating a central node for explaining an underwater communication method according to an exemplary embodiment of the present invention.

FIG. 7 is a schematic diagram illustrating a central node for explaining an underwater communication method according to an exemplary embodiment of the present invention.

Referring to FIG. 5, a plurality of sensor nodes (10) may collect the underwater information and transmit the collected underwater information to the central node (20). At this time, transmission/reception of underwater information may be realized between the central node (20) and the plurality of sensor nodes (10) using ultrasonic waves, enabling signal transmission inside underwater communication network (50) in view of particularity of medium. Furthermore, position data of sensor node (10) may be also included and transmitted when the signal is transmitted from the sensor node (10) to the central node (20). The position information of sensor node (10) is preferable to be recorded or the sensor node (10) and stored at a time when the sensor node (10) is installed at an arbitrary underwater position. However, the position of sensor node (10) is difficult to be fixedly installed in view of particularity of underwater environment. Hence, although it is expressed as position information, it is preferable to understand the position information simply as sensor node (10) recognition information.

The central node (20) may transmit the underwater information collected from the plurality of sensor nodes (10) to the land. The central node (20) may transmit the aggregated underwater information to a management node (64) at a terrestrial communication network (60). Thus, the central node (20) may perform the underwater communication with the plurality of sensor nodes (10) inside the underwater communication network (50), and simultaneously perform a communication with the terrestrial management node (64). Furthermore, the management node (64) ay perform a function of connecting the underwater information transmitted from the central node (20) with a terrestrial communication network (62) using a wireless signal.

Referring to FIG. 6, the sensor node (10) may include more than one sensor part (30) for collecting data necessary in the underwater environment, a data transmission part (36) for modulating the data sensed by each sensor part (30), converting the data to ultrasonic wave and transmitting the converted data to a data transmission part (36) and a data reception part (38) for demodulating an ultrasonic signal by receiving the ultrasonic signal transmitted from the central node (20). The data transmission part (36) and the data reception part (38) may be included in a transmission/reception part (40), and a controller (32) may be further included in order to perform a control role between the sensor part (30) and the transmission/reception part (40). Furthermore, various data and algorithm necessary for entire operation control of the sensor node (10) are stored, and a memory (34) storing the underwater information detected by the sensor part (30) is included to form an entire configuration.

The plurality of sensor parts (30) may sense various kinds of underwater information including water temperature adequate for its purpose, dissolved oxygen and seismic waves, and output the sensed data to the controller (32). Although the sensor part (30) may be a digital sensor, the sensor part (30) may be so configured as to convert the data sensed in an analogue signal to a digital signal and, to output the digitalized signal. In this case, the sensor part (30) may include an A/D (Analogue/Digital) converter converting an analogue signal to a digital signal. Furthermore, the signal-processed data in all configurations of the present invention are basically digital signals.

The transmission/reception part (40) may perform a function of transmitting or receiving data using the ultrasonic waves in the water. That is, the data transmission part (36) may modulate the underwater information detected by the sensor part (30) and convert the underwater information to an ultrasonic signal and transmit the ultrasonic signal to the central node (20). Furthermore, the data reception part (38) may receive the ultrasonic signal transmitted from the central node (20), demodulate the ultrasonic signal and output the demodulated signal to the controller (32).

The illustrated sensor node (10) may receive the underwater information transmitted from the central node (20) through the data reception part (38). At this time, the data reception part (38) may be realized of frequency setting using a frequency included in the forward direction frequency band in order to enable receipt of signal transmitted from the central node (20). Furthermore, the data transmission part (36) may be set of a particular frequency included in the frequency band allocated thereto, and then, transmit the information for transmission to the central node (20) on the set particular frequency. Therefore, the transmission/reception part (40) may be included of a configuration in which the frequency setting is realized under the control of the controller (32). This configuration is well known in the art and omitted in further elaboration thereof. Furthermore, a forward direction frequency band is set when a signal is received from the central node (20) under an initial setting process, which is a state where the frequency setting of each sensor node (10) is not realized, and a lowest frequency band is set among the divided backward direction frequency band when a signal is transmitted to the central node (20) prior to the initial setting.

In addition, although the sensor node (10) in the present invention may be fixedly installed at a particular position in the underwater environment, the sensor node (10) is inevitably moved in most situations within a predetermined area due to influence of ocean currents in light of the underwater environment. Because of a high possibility of the sensor node (10) being moved as noted above, a distance measurement to the central node (20) is preferable to be realized in real time during the time of the underwater information measurement being made. However, in case the real time control is irrational, it is also preferable that a repeated measurement be made at a predetermined interval while avoiding a time when the underwater communication is performed. Because the useable frequency versus distance is changeable, the sensor node (10) is such that there is a need of the useable frequency band being controlled in real time for underwater communication with the central node (20). Under this circumstance, the transmission/reception part (40) of the sensor node (10) is preferred to be configured of a variable control for the set frequency. That is, configuration is made in such a manner that the frequency for transmission of information is variably controlled in response to a current position of the sensor node (10) and the information to be transmitted is made to be transmitted to the central node (20). Furthermore, the movement position of sensor node (10) is preferably realized within a particular radius where signal transmission/reception with the central node (20) is possible to thereby prevent a risk of loss of the sensor node (10).

The controller (32) may perform a control over storage various types of underwater information detected by the sensor part (30), or perform a control function over transmission/reception of underwater information realized through the transmission/reception part (40). In addition, the controller (32) may perform a control for distance detection between the sensor node (10) and the central node (20). To this end, the controller (32) may include a configuration where a reference signal transmitted from the central node (20) for distance detection is received from the data reception part (38), and size of received power is detected. The power intensity of the received signal may be detected through a simple calculation process by directly detecting the power of received signal, or detecting a current or a voltage. The received power size detection configuration may be applicable by various technologies including a well-known power detector. Furthermore, a current size may be simply detected by installation at a receiving part of a resistance for current detection. These detection technologies are known art and any further elaboration thereto will be omitted. Moreover, the distance estimation using the power intensity of detected receptions signal may be possible by using power intensity versus distance value pre-stored in the memory (34).

Furthermore, as another method for distance detection, the controller (32) may detect the distance by detecting a delayed time consumed by arrival of a signal transmitted from the central node (20) to the sensor node (10). The detection of delayed time may be detectable by a difference through a comparison between time information starting a signal transmission by the central node (20) and time information of signal arrival, for example. Furthermore, in order to detect the arrival time information, it is preferable that the controller (32) be included with a time counting function. In addition, the distance estimation using the detected delayed time may be possible by using a delayed time versus distance value pre-stored in the memory (34).

The memory (34) may be used for storing various types of information including a signal detected by the sensor node (10) and a signal used by the sensor node (10). The detection information of the sensor part (30) may be also stored in the memory (30). Particularly, the memory (34) may store various types of information to be used for distance detection when the distance detection is directly realized by the sensor node (10). For example, the memory (34) may store information for determining the intensity of received power, information for detecting the delayed time, information for determining a distance between the central node (20) and the sensor node (10) using the intensity of received power and frequency band information capable of receiving the underwater communication in response to the estimated distance information. The controller (32) can perform the processes of distance estimation and request of particular frequency band and the like, using the various types of information stored in the memory (34).

Referring to FIG. 7, the central node (20) may be formed by including a first transmission/reception part (22) for performing transmission/reception of underwater communication with the sensor node (10) using ultrasonic waves, and a second transmission/reception part (21) for performing transmission/reception of a signal with the management node (64). Furthermore, the central node (20) may include a controller (28) for performing control of the first and second transmission/reception parts (21, 22) and controlling information storage, and a memory (29) for storing various types of information. The second transmission/reception part (21) may be preferably configured to transmit the signal using ultrasonic waves depending on whether a position of the central node (20) is on the sea surface or under the sea surface, or to transmit the signal using a wireless signal.

Furthermore, the central node (20) may include a frequency divider (27) for dividing an entire useable frequency band to a forward direction frequency band and a backward direction frequency band, and dividing in turn the backward direction frequency band to a small frequency band. The frequency divider (27) may be included in the first transmission/reception part (22) because of being used when transmitting and receiving the underwater information with the sensor node (10).

The frequency divider (27), as illustrated in FIG. 4, may be so configured as divide the entire frequency band useable in the central node (20) to small frequency bands as many as the number of areas (M number). Hence, the controller (28) may control in such a manner that a normal transmission/reception of signal can be implemented by controlling the frequency division of the frequency divider (27), and the frequency of the frequency divider (27) can be divided to relevant frequencies during transmission/reception of the signal with an arbitrary sensor node (10).

The data transmission part (26) inside the first transmission/reception part (22) may be set with a forward direction frequency band (f0) to enable signal transmission to all sensor nodes. Furthermore, the data reception part (24) inside die first transmission/reception part (22) may be set with all backward direction frequency bands existent in the frequency band allocated to an arbitrary sensor node where the underwater communication is to be performed. However, the data reception part (24) may be set with a lowest frequency band among the divided backward direction frequency bands during an initial setting process where a frequency is not set at each sensor node (20). This is to receive a signal transmitted from the sensor node existent at all distances because the sensor node (10) is in a situation before the frequency setting.

Toward this end, the frequency is divided through the frequency divider (27) under the control of the controller (28), a series of processes is controlled where the frequency of the data reception part (24) is set by the divided frequency. The frequency dividing operation of the frequency divider is preferably implemented by a digital method. Furthermore, the data reception part (24) may include a frequency variable control configuration to enable a normal signal reception in the signal transmission/reception processes with all sensor nodes.

Furthermore, the controller (28) may perform a control for distance detection between the sensor node (10) and the central node (20) in response to power management of each sensor node (10) and multiple access control and necessity to the sensor node (10) existent at a similar distance to traffic control. In the present invention, even a distance detection process may be performed at the controller (32) of the sensor node (10), and a distance detection process at the controller (28) of the central node (20) may be also implemented. Therefore, in an initial process where the frequency setting of the sensor node is not realized, the controller (28) may include a configuration where the data reception part (24) receives a reference signal transmitted for distance detection at the Sensor node (10) and the size of received power is detected.

The power intensity of the received signal may be detected through a simple calculation process by directly detecting the power of received signal, or detecting a current or a voltage. The received power size detection configuration may be applicable by various technologies including a well-known power detector. It is also possible that the size detection of received power is implemented by the sensor node and only the detection information thereof is received. Furthermore, a current size may be simply detected by installation at a receiving part of a resistance for current detection. Likewise, it is also possible that the detection of current size is implemented by the sensor node and only the detection information thereof is received. These detection technologies are known art and any further elaboration thereto will be omitted.

Furthermore, the distance estimation using the power intensity of the detected received signal may be possible by using power intensity versus distance value pre-stored in the memory (29).

Furthermore, as another method for distance detection, the controller (28) may detect the distance by detecting a delayed time consumed by arrival of a signal transmitted from the sensor node (10) to the central node (20). The detection of delayed time may be detectable by a difference through a comparison between time information starting a signal transmission by the sensor node (10) and time information of signal arrival at the central node (20), for example. Furthermore, in order to detect the arrival time information, it is preferable that the controller (28) be included with a time counting function. In addition, the distance estimation using the detected delayed time may be possible by using a delayed time versus distance value pre-stored in the memory (29).

The memory (29) may be used for storing various types of information including a signal detected by the sensor node (10) and a signal used by the sensor node (10). Particularly, the memory (29) may store various types of information to be used for distance detection when the distance detection is realized by the central node (20). For example, the memory (29) may store information for determining a distance between the central node (20) and the sensor node (10) using the intensity of received power and delayed time provided from the sensor node (10), and frequency band information capable of underwater communication allocatable in response to the estimated distance information. The controller (29) can estimate a distance using the various types of information stored in the memory (29) and select a particular frequency band to be allocated to an arbitrary sensor node. Furthermore, the memory (29) may include control information for frequency division and may include information related to the divided frequency bands and sensor node set thereto. The memory (29) may also store the underwater information collected from the sensor nodes.

Figure 8:
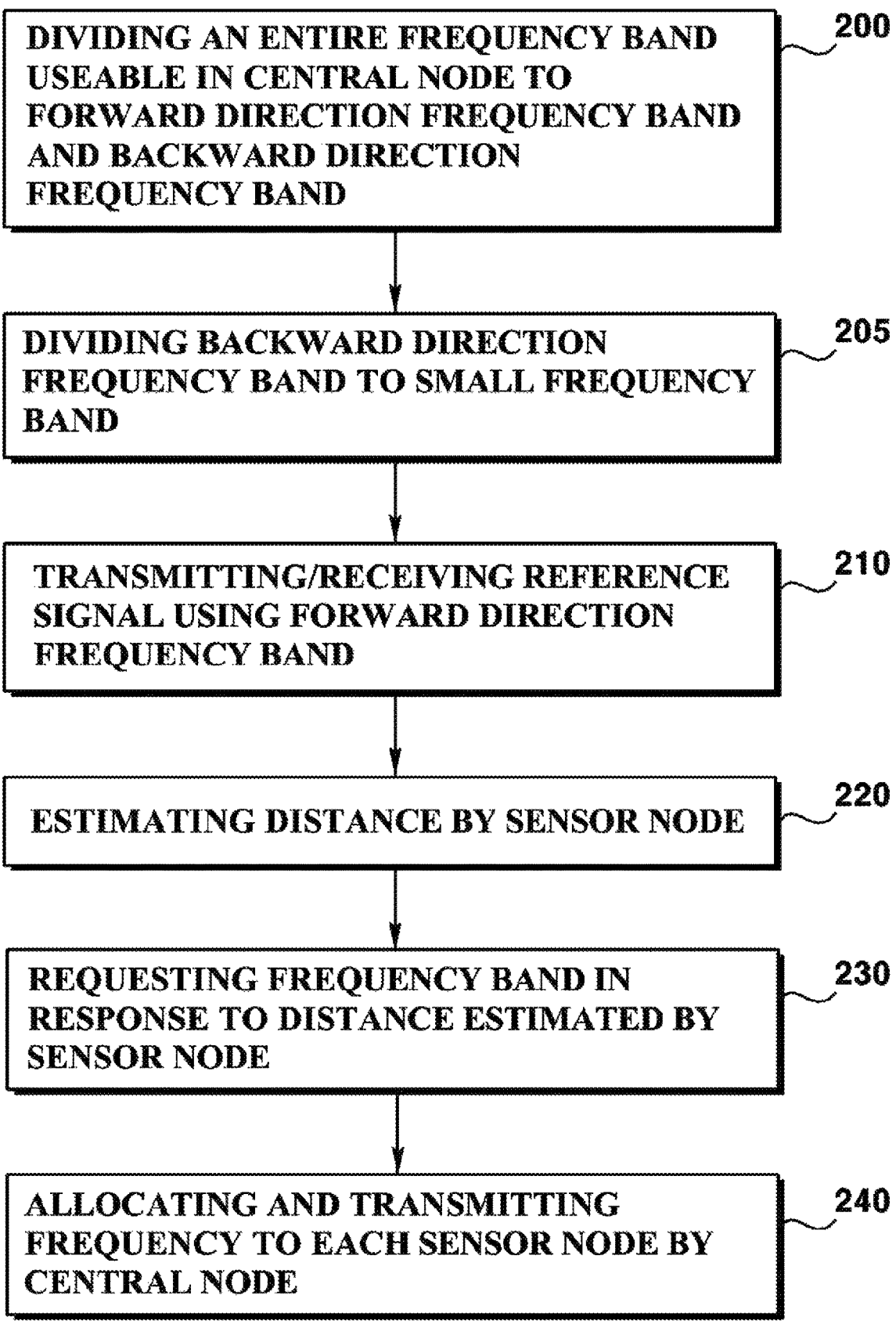
FIG. 8 is a flowchart of operation for underwater communication method for explaining an underwater communication method according to an exemplary embodiment of the present invention.

Next, FIG. 8 is a flowchart of operation for underwater communication method for explaining an underwater communication method according to an exemplary embodiment of the present invention. FIG. 8 illustrates an operation process according to a first control method that is used when the central node (20) allocates a particular frequency to the sensor node (10).

The underwater communication network according to the present invention must detect distance information between the central node (20) and the sensor node (10). Furthermore, the sensor node (10) may be allocated with a particular frequency band in response to the detected distance information. That is, there is a need of a particular frequency being adaptively allocated in response to the detected distance information.

First, the controller (28) of central node (20) may ascertain an entire useable frequency band and divide the entire useable frequency band to a forward direction frequency band and a backward direction frequency band as illustrated in FIG. 3 (Step 200).

Furthermore, the controller (28) may perform a control function of dividing the backward direction frequency band to small frequency bands as many as the number of areas (M number) illustrated in FIG. 4 (Step 205). The Steps 200 and 205 are preferably pre-set in response to the performance of central node. That is, when a signal is transmitted and received in an underwater environment, the central node (20) may sot and pre-store by including a farthest transmissible frequency in the forward direction frequency band. Furthermore, a signal transmissible distance (area) may be pre-divided and stored between the central node (20) and the plurality of sensor nodes (10). The thus-stored distance and frequency values may be stored in the memory (29) of central node (20) and the memory (34) of sensor node (10). Thereafter, a frequency setting process may be preferably realized based on the memory values.

Furthermore, a reference signal to be used for detection of pre-stored distance information may be read from the memory (29). The reference signal may be carried on the forward direction frequency band, and converted to an ultrasonic signal through the data transmission/reception part (26) to be transmitted to all sensor nodes (10) included in the entire useable frequency bands of the central node (20), where the reception part (38) of sensor node (10) may receive the reference signal (Step 210).

The sensor nodes (10) having received the reference signal at Step 210 may detect the power intensity of received signal, and time delay used in the signal transmission, and a distance with the central node (20) may be estimated using the detected signal (Step 220). The distance estimation between the sensor node (10) and the central node (20) may be implemented using the power intensity of received signal.

After the distance estimation is completed at Step 220, the sensor node (10) may request the central node (20) to allocate a frequency band corresponding to the estimated distance to the sensor node's frequency band (Step 230). The process of requesting a particular frequency band at Step 230 is prior to the allocation of frequency band to the relevant sensor node, and therefore, in this case, the frequency band request signal is transmitted using the frequency band set as the lowest frequency band among the backward direction frequency bands. Furthermore, the frequency band value corresponding to the distance estimated at Step 230 may be selected based on the pre-set and stored value in the memory (34).

Thereafter, the central node (20) may collect the frequency band information requested from the plurality of sensor nodes (10), allocate a frequency band adequate to each sensor node (10), and transmit the allocated frequency information to a relevant sensor node side (Step 240). Thus, the data reception part (24) of the central node (20) is also set at the forward direction frequency band up to Step 240.

Successively, the sensor node (10) may receive, from the central node (20), an ultrasonic signal carried on the frequency band (f0) allocated to the forward direction frequency band during transmission/reception of underwater information with the central node (20), and may transmit, to the central node (20), the ultrasonic signal loaded with the underwater information at the frequency band allocated within the backward frequency band.

Through these processes, a frequency band adaptively adequate to the distance information of the central node (20) and the sensor node (10) may be allocated between the central node (20) and the plurality of sensor nodes (10) to thereby implement the underwater information communication. Hence, the present invention is such that a plurality of sensor nodes (10) is allocated with an adequate frequency in response to each distance within a limited frequency band to thereby prevent the generation of un-useable sensor nodes caused by absurdity of allocated frequency. That is, an underwater communication between the plurality of sensor nodes (10) and the central node (20) can be efficiently realized.

Figure 9:
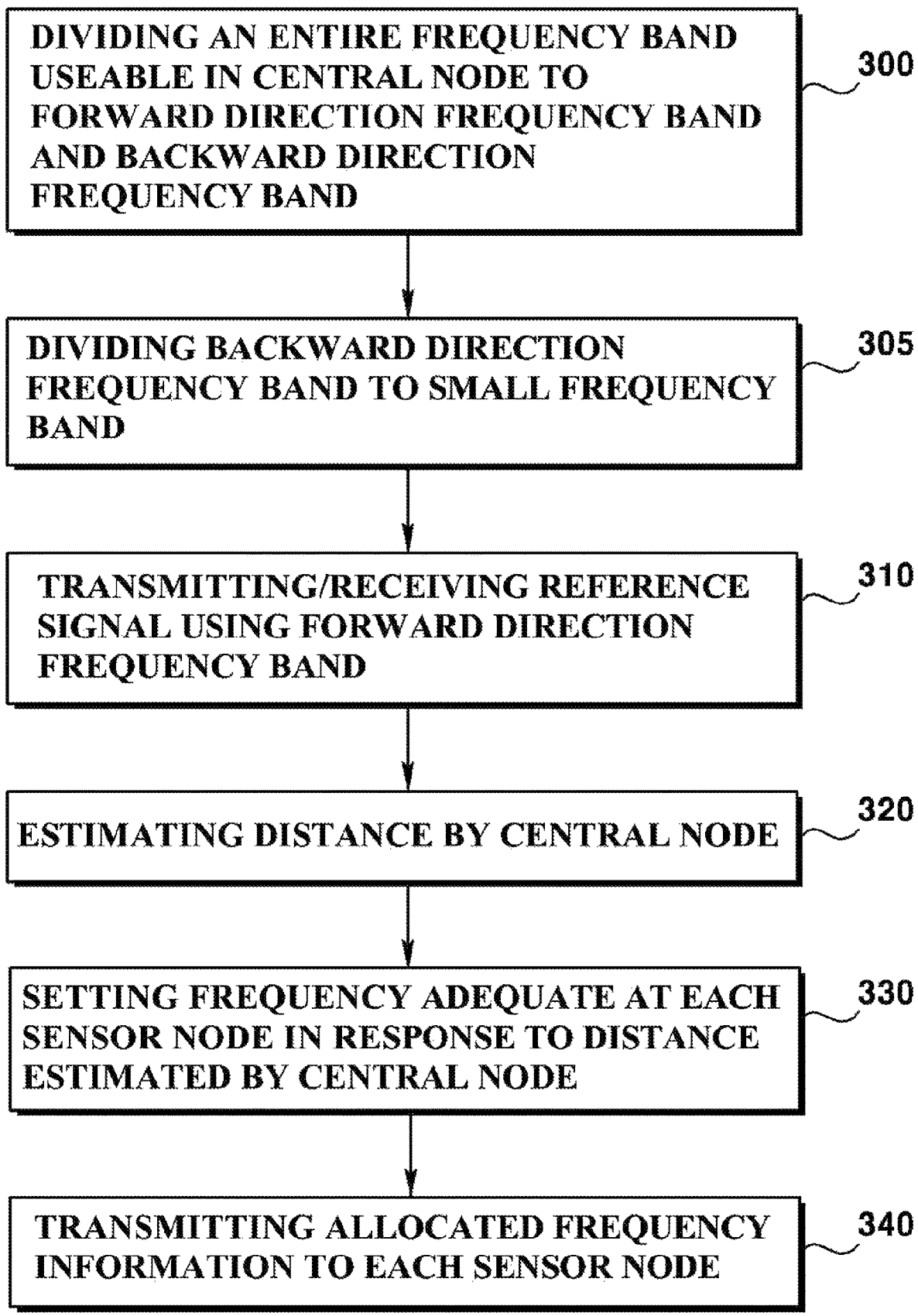
FIG. 9 is a flowchart of operation for underwater communication method for explaining an underwater communication method according to an exemplary embodiment of the present invention.

Next, FIG. 9 is a flowchart of operation for underwater communication method for explaining an underwater communication method according to an exemplary embodiment of the present invention.

The illustrated FIG. 9 shows an operation process according to a second control method used when the central node (20) allocates a particular frequency to the sensor nodes (10). The illustrated exemplary embodiment teaches a process of estimating a distance to each sensor node (10) under its own discretion, and allocating a frequency to each sensor node (10) in response to the estimated distance.

First, the controller (28) of the central node (20) may ascertain its useable entire frequency band, and divide the entire useable frequency band to forward direction frequency band and backward direction frequency band, as illustrated in FIG. 3 (Step 300).

Furthermore, the controller (28) may perform a control of dividing the backward direction frequency band to small frequency lands as many as the number areas (M number) illustrated in FIG. 4 (Step 305).

The Steps 300 and 305 are preferably pre-set in response to die performance of central node (20). That is, when a signal is transmitted and received in an underwater environment, the central node (20) may set and pre-store by including a farthest transmissible frequency in the forward direction frequency band. Furthermore, a signal, transmissible distance (area) may be pre-divided and stored between the central node (20) and the plurality of sensor nodes (10). The thus-stored distance and frequency values may be stored in the memory (29) of central node (20) and the memory

(34) of sensor node (10). Thereafter, a frequency setting process may be preferably realized based on the memory values.

Furthermore, a reference signal to be used for detection of pre-stored distance information may be read from the memory. The reference signal may be carried on the forward direction frequency band, and converted to an ultrasonic signal to allow a transmission operation from all sensor nodes (10) to the central node (20). The central node (20) having received the reference signal transmitted from the plurality of sensor nodes (10) through the data reception part (24) may detect the power intensity of received signal from each sensor node and the delayed time used for transmission time. The signal transmission/reception process for detection signal is in a state prior to allocation of frequency band to the relevant sensor node. Thus, the data transmission part (36) of sensor node (10) and the data reception part (24) of central node (20) may perform transmission/reception of signal using the frequency band set at the lowest frequency band among the backward direction frequency bands (Step 310). Meantime, it may be also possible for the sensor node (10) to directly perform the signal detection operation, and for the central node (20) to input the detected control information for subsequent use of distance estimation.

The sensor nodes (10) having detected the signal for distance estimation at Step 310 may estimate a distance between the central node and each of the sensor nodes by using the power intensity of the received signal at each of the sensor node, and time delay used for signal transmission (Step 320). The distance estimation may be possible by estimating a distance using power intensity versus distance value pre-stored in the memory (29). Furthermore, it is possible to estimate a distance by using time delay versus distance value pre-stored in the memory (29).

Subsequently, the central node (20) may adaptively allocate a frequency band adequate to each sensor node (10) in response to the estimated distance, and transmit the allocated frequency information to a relevant sensor node side (Step 330, Step 340).

Successively, the sensor node (10) may receive, from the central node (20), an ultrasonic signal carried on the frequency band (f0) allocated to the forward direction frequency band during transmission/reception of underwater information with the central node (20), and may transmit, to the central node (20), the ultrasonic signal loaded with the underwater information at the frequency band allocated within the backward frequency band.

Through these processes, a frequency band adaptively adequate to the distance information of the central node (20) and the sensor node (10) may be allocated between the central node (20) and the plurality of sensor nodes (10) to thereby implement the underwater information communication. Hence, the present invention may enable an efficient underwater communication between the plurality of sensor nodes (10) and the central node (20) within the limited frequency band.

Figure 10:
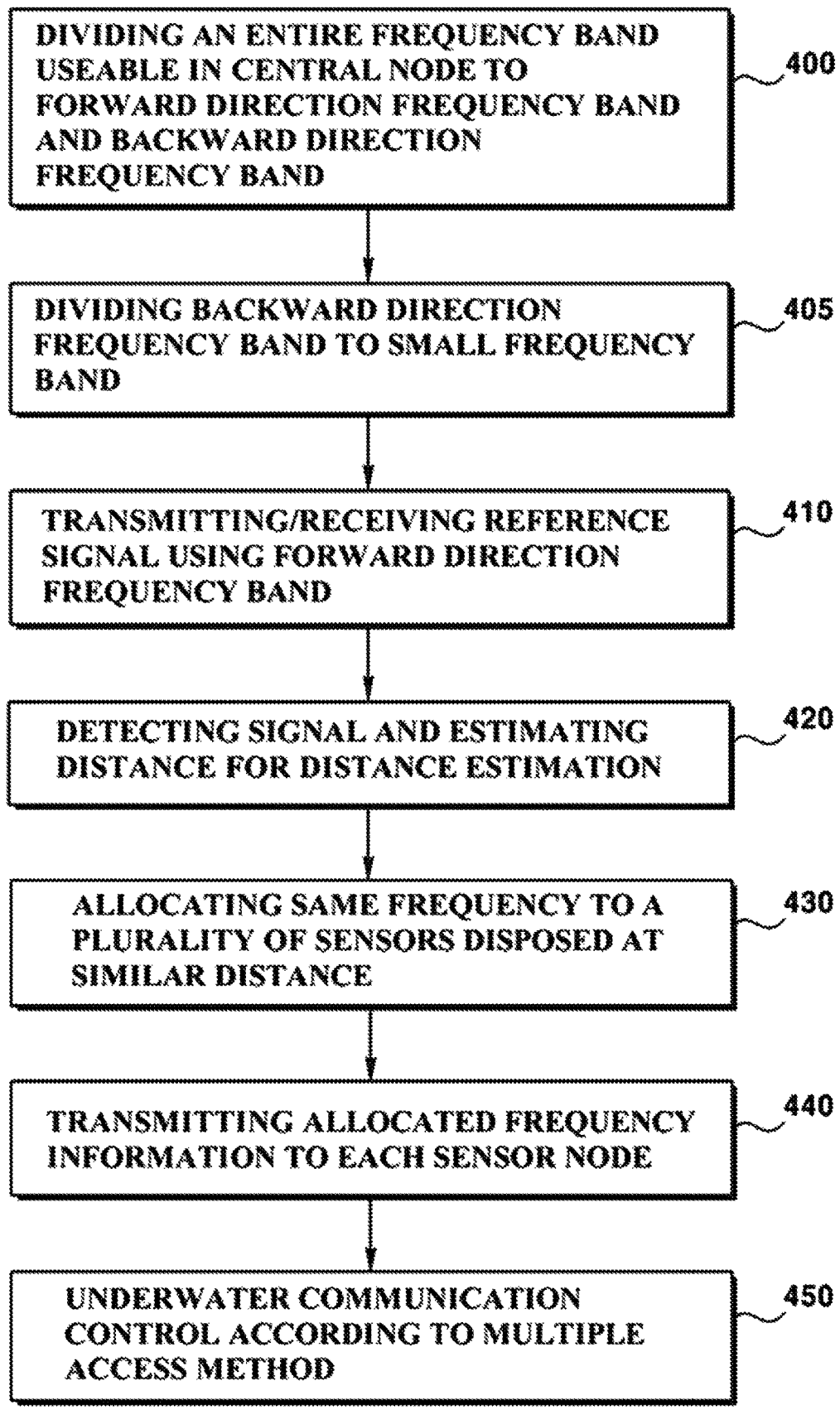
FIG. 10 is a flowchart of operation for underwater communication method for explaining an underwater communication method according to an exemplary embodiment of the present invention.

Next, FIG. 10 is a flowchart of operation for underwater communication method for explaining an underwater communication method according to an exemplary embodiment of the present invention.

The illustrated FIG. 10 shows an operation process according to a third control method used when the central node (20) allocates a particular frequency to the sensor nodes (10). The illustrated exemplary embodiment shows a process chart to demonstrate that a plurality of sensor nodes can be set with the same frequency band.

The controller (28) of the central node (20) may ascertain its useable entire frequency band, and divide the entire useable frequency band to forward direction frequency band and backward direction frequency band, as illustrated in FIG. 3 (Step 400).

Furthermore, the controller (28) may perform a control of dividing the backward direction frequency band to small frequency bands as many as the number of areas (M number) illustrated in FIG. 4 (Step 405).

The Steps 400 and 405 may be preferably pre-set in response to the performance of central node (20). That is, when a signal is transmitted and received in an underwater environment, the central node (20) may set and pre-store by including a farthest transmissible frequency in the forward direction frequency band.

Furthermore, when the central node (20) transmit and receive a signal in an underwater environment, the central node (20) may divide and pre-store a signal transmissible distance (area) in a memory. The distance and frequency values thus divided and set may be preferably stored in the memory (29) of central node (20) and in the memory (34) of sensor node (10), and then be preferably used in the subsequent frequency setting process.

Furthermore, a reference signal to be used for detection of pre-stored distance information may be read from the memory (29). The reference signal may be carried on the forward direction frequency band, and converted to an ultrasonic signal through the data transmission part (26) to be transmitted to all sensor lodes (10) included in the entire useable frequency band of the central node (20) (Step 410). The central nodes (20) having received the reference signal transmitted at Step 410 through the data reception part (38) may detect the power intensity of received signal and/or the delayed time used for signal transmission, and may transmit the detected signal to the central node (20). The detected signal transmission process is in a state prior to allocation of frequency band to the relevant sensor node, where the detected signal may be transmitted to the central node (20) using the lowest frequency band among the backward direction frequency bands.

The controller (28) having received the detected signal may estimate a distance between the central node and each of the sensor nodes by using the power intensity of the received signal from the sensor node, and/or the time delay used for signal transmission (Step 420). The distance estimation at this time may be possible by using power intensity versus distance value pre-stored in the memory (29). Furthermore, it is also possible to estimate a distance by using time delay versus distance value pre-stored in the memory (29).

Subsequently, the central node (20) may adaptively allocate a frequency band adequate to each sensor node (10) in response to the estimated distance (Step 430).

When the frequency is allocated to the sensor node (10) at the Step 430, a same frequency band may be allocated to sensor nodes disposed at a same distance or a similar distance, as illustrated in FIG. 4.

At this time, the central node (20) may wrap sensor nodes of signal transmissible/receivable to a same frequency band in a same area. Furthermore, the same area may be allocated with the same frequency band. Furthermore, the frequency band information allocated to each area at Step 430 may be transmitted to a plurality of sensor nodes (Step 440).

The sensor node (10) may receive, from the central node (20), an ultrasonic signal carried on the frequency band (f0) allocated to the forward direction frequency band during transmission/reception of underwater information with the central node (20), and may transmit, to the central node (20), the ultrasonic signal loaded with the underwater information at the frequency band allocated within the backward frequency band.

Meantime, the sensor nodes disposed within the same area may perform transmission of underwater signals each having a same frequency band. Thus, in this case, the controller (28) inside the central node (20) may need to perform an adequate control of underwater communication with a plurality of sensor nodes existent in the same area. In this case, as explained before, an underwater communication control may be implemented according to multiple access method (Step 450).

The reason of allocating the same frequency to several sensor nodes is that there is a limit in the frequency bands useable by the central node (20). For example, there is no way but to increase the number of sensor nodes in order to accurately understand the underwater information. In this case, there may be generated a case where the number of sensor nodes installed within an entire frequency band useable by the central node (20) is greater than the number of divided backward direction frequency band. At this time, as illustrated in FIG. 4, the sensor nodes existent in the same area may be allocated with the same frequency band to thereby control the underwater communication.

The exemplary embodiment of FIG. 10 of the present invention may perform the underwater communication by allocating a plurality of sensor nodes (10) to the same frequency band within a limited frequency band and by efficiently controlling a plurality of sensor nodes through the multiple access method of central node (20). Thus, an efficient underwater communication control can be also enabled on the sensor nodes having more numbers than those of the divided frequency band.

Thus, the foregoing detailed explanation may be considered not as being of limited interpretation but as being exemplary. The scope of the present invention may be determined by rational interpretation of attached claims, and all changes within the equivalent scope of the present invention are included within the scope of the present invention.

The invention claimed is:

1. An underwater communication method in an underwater communication network comprising central node transmitting underwater information to a terrestrial network by aggregating detection information from a plurality of sensor nodes detecting the underwater information, the method comprising:
   recognizing, by the central node, an entire useable frequency band inclusive of a lowest frequency and a highest frequency, setting a forward direction frequency band inclusive of said lowest frequency, and setting a backward direction frequency band inclusive of said highest frequency and said remaining frequencies in said entire usable frequency band;
   dividing the backward direction frequency band to a plurality of small frequency bands, including a lowest backward frequency band comprising the lowest backwards direction frequency;
   performing an initial setting process comprising setting a data reception part of said central node to said lowest backwards direction frequency;
   estimating a distance between the central node and each of the plurality of sensor nodes;
   allocating one of said small frequency bands to each of said plurality of sensor nodes based on the estimated distance thereto;
   wherein the central node uses the forward direction frequency band to transmit a signal from the central node to the plurality of sensor nodes;
   wherein each of the plurality of sensor nodes uses the allocated small frequency band to transmit a signal to the central node;
   wherein said lowest backward frequency band is allocated to the sensor node disposed at the farthest distance away from said central node; and
   wherein each of the plurality of sensor nodes variably controls the frequency for transmission in response to a current position;
   wherein said data reception part of said central node is set with all backward direction frequency bands existent in the frequency band allocated to an arbitrary sensor node where the underwater communication is to be performed.

2. The underwater communication method of claim 1, wherein the distance estimating Step includes:
   transmitting the forward direction frequency band including a reference signal from the central node to the plurality of sensor nodes;
   receiving a transmission signal from one of the plurality of sensor node and detecting a power of a reception signal; and
   estimating a distance value corresponding to the detected power size.

3. The underwater communication method of claim 1, wherein the distance estimating Step includes:
   transmitting the forward direction frequency band including a reference signal from the central node to the plurality of sensor nodes;
   detecting a propagation time consumed from transmission of the reference signal to arrival of the reference signal at one of said plurality of sensor nodes; and
   estimating a distance value corresponding to the detected propagation time.

4. The underwater communication method of claim 1, wherein the distance estimating Step is performed by either the central node or one of said plurality of the sensor nodes.

5. The underwater communication method of claim 1, wherein the frequency allocating Step includes requesting a frequency band adequate to the estimated distance.

6. The underwater communication method of claim 1, wherein the small frequency band allocated to the plurality of sensor nodes includes using at the time of signal transmission from the sensor node to the central node.

7. The underwater communication method of claim 1, wherein the Step of dividing the backward direction frequency band to a plurality of small frequency band comprises dividing the backward direction frequency band to a value corresponding to a number of distance bands within a receivable/transmissible distance using a particular frequency, wherein each such distance band is a different distance from said central node.

8. The underwater communication method of claim 1, wherein said plurality of sensor nodes comprises at least three sensor nodes.

9. The underwater communication method of claim 6, wherein the signal transmission from the central node to the sensor node prior to allocation of the small frequency band to the sensor node is realized by the forward direction frequency band, and the signal transmission from the sensor node to the central node is realized by the lowest backward direction frequency band.

10. The underwater communication method of claim 7, wherein the plurality of sensors having the same frequency band is controlled in the underwater communication by multiple connection method by allocating the same frequency band to the plurality of sensors disposed at the divided distance.

11. In an underwater communication network comprising a central node in operative communication with a terrestrial network and a plurality of underwater sensor nodes, a method for the transmission of underwater information in the underwater communication network, comprising the steps of:

determining an entire useable frequency band suitable for the underwater propagation of sound between any of said plurality of sensor nodes and said central node, said frequency band extending between a lowest frequency and a highest frequency;

assigning a forward direction frequency band inclusive of said lowest frequency for signal transmission from said central node to the plurality of sensor nodes;

subtracting said forward direction frequency band from said entire frequency band and assigning the remainder as a backward direction frequency band for signal transmission from the plurality of underwater sensor nodes to said central node;

subdividing said backward direction frequency band into a number M of smaller discrete frequency bands each for signal transmission from one of said plurality of sensor nodes to the central node, including a lowest backward frequency band comprising the lowest backwards direction frequency;

performing an initial setting process comprising setting a data reception part of said central node to said lowest backwards direction frequency;

estimating distance between the central node and each one of the plurality of sensor nodes;

assigning one of said smaller discrete frequency bands to each of said plurality of sensor nodes based on the estimated distance from said central node thereto;

wherein the central node uses the forward direction frequency band to transmit a signal from the central node to the plurality of sensor nodes, wherein each of the plurality of sensor nodes uses the allocated smaller discrete frequency band to transmit a signal to the central node;

wherein said lowest backward frequency band is allocated to the sensor node disposed at the farthest distance away from said central node; and wherein each of the plurality of sensor nodes variably controls the frequency for transmission in response to a current position;

wherein said data reception part of said central node is set with all backward direction frequency bands existent in the frequency band allocated to an arbitrary sensor node where the underwater communication is to be performed.

12. The method for the transmission of underwater information in the underwater communication network according to claim 11, wherein said step of assigning one of said smaller discrete frequency bands to each of said plurality of sensor nodes further comprises sequentially assigning the smaller discrete frequency band comprising the highest frequency to the closest one of said plurality of sensor nodes, and the smaller discrete frequency band comprising the lowest backward direction frequency to the farthest of said plurality of sensor nodes.

13. The method for the transmission of underwater information in the underwater communication network according to claim 11, wherein said step of estimating a distance is performed by either the central node or one of said plurality of the sensor nodes.

14. The underwater communication method of claim 11, wherein said step of estimating a distance includes, transmitting the forward direction frequency band including a reference signal from the central node to the plurality of sensor nodes;

receiving a transmission signal from one of the plurality of sensor node and detecting a power size of a reception signal; and estimating a distance value corresponding to the detected power size.

15. The underwater communication method of claim 11, wherein said step of estimating a distance includes, transmitting the forward direction frequency band including a reference signal from the central node to the plurality of sensor nodes;

detecting a propagation time consumed during transmission of the reference signal to arrival of the reference signal at one of said plurality of sensor nodes; and estimating a distance value corresponding to the detected propagation time.

* * * * *